US012074968B2

(12) United States Patent
Kato

(10) Patent No.: US 12,074,968 B2
(45) Date of Patent: Aug. 27, 2024

(54) INFORMATION SHARING SYSTEM, INFORMATION SHARING METHOD, INFORMATION SHARING DEVICE, RELAY DEVICE AND PROGRAM

(71) Applicant: NIPPON TELEGRAPH AND TELEPHONE CORPORATION, Tokyo (JP)

(72) Inventor: Go Kato, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 205 days.

(21) Appl. No.: 17/798,526

(22) PCT Filed: Feb. 10, 2020

(86) PCT No.: PCT/JP2020/005137
§ 371 (c)(1),
(2) Date: Aug. 9, 2022

(87) PCT Pub. No.: WO2021/161386
PCT Pub. Date: Aug. 19, 2021

(65) Prior Publication Data
US 2023/0089284 A1 Mar. 23, 2023

(51) Int. Cl.
*H04L 9/08* (2006.01)
(52) U.S. Cl.
CPC .......... *H04L 9/0855* (2013.01); *H04L 9/0869* (2013.01)
(58) Field of Classification Search
CPC ........ H04L 9/0855; H04L 9/0869; H04L 9/08
See application file for complete search history.

(56) References Cited

U.S. PATENT DOCUMENTS 10,949,546 B2 * 3/2021 Chung .................. H04L 9/0894
11,888,846 B2 * 1/2024 Zhuravlev ............. H04L 67/141

FOREIGN PATENT DOCUMENTS

WO 2019128785 A1 7/2019

OTHER PUBLICATIONS

Piparo et al. (2015) "Long-Distance Trust-Free Quantum Key Distribution" IEEE Journal of Selected Topics in Quantum Electronics, vol. 21, No. 3.
(Continued)

*Primary Examiner* — Quazi Farooqui

(57) ABSTRACT

A first information sharing device shares secret information with each relay device adjacent to the first information sharing device along a plurality of paths. A second information sharing device shares secret information with each relay device adjacent to the second information sharing device along the plurality of path. Each of the plurality of relay devices shares secret information with each relay device adjacent to each of the relay devices along the plurality of paths, generates public information using the shared secret information, and transmits the generated public information to the second information sharing device. The first information sharing device generates shared information using the secret information shared with each relay device adjacent to the first information sharing device along the plurality of paths. The second information sharing device generates shared information using the secret information shared with each relay device adjacent to the second information sharing device along the plurality of paths and the public information received from the relay device.

15 Claims, 4 Drawing Sheets

(56) References Cited

OTHER PUBLICATIONS

SECOQC (2007) "SECOQC White Paper on Quantum Key Distribution and Cryptography" Version 5.1.
Sasaki et al. (2011) "Field test of quantum key distribution in the Tokyo QKD Network" Optics Express, vol. 19, No. 11.
Schartner et al. (2009) "How to overcome the 'Trusted Node Model' in Quantum Cryptography" International Conference on Computational Science and Engineering, Aug. 29, 2009.
Ma et al. (2017) "A Multiple Paths Scheme with Labels for Key Distribution on Quantum Key Distribution Network" IEEE 2nd Advanced Information Technology, Electronic and Automation Control Conference (IAEAC), Mar. 25, 2017.
Liu et al. (2018) "Security Analysis of Stochastic Routing Scheme in Grid-Shaped Partially-Trusted Relay Quantum Key Distribution Network" Chinese Journal of Electronics, vol. 27, No. 2, pp. 234-240.
Salvail et al. (2009) "Security of Trusted Repeater Quantum Key Distribution Networks" arXiv.
Zhou et al. (2019) "Security assessment and key management in a quantum network" arXiv [online] website: https://arxiv.org/abs/1907.08963.

* cited by examiner

INFORMATION SHARING SYSTEM, INFORMATION SHARING METHOD, INFORMATION SHARING DEVICE, RELAY DEVICE AND PROGRAM

CROSS-REFERENCE TO RELATED APPLICATIONS

This application is a U.S. National Stage Application filed under 35 U.S.C. § 371 claiming priority to International Patent Application No. PCT/JP2020/005137, filed on 10 Feb. 2020, the disclosure of which is hereby incorporated herein by reference in its entirety.

TECHNICAL FIELD

The present invention relates to an information security technology.

BACKGROUND ART

Sharing a random number (a random number uncorrelated with a third party) between two parties located remotely is one function that will be useful for realizing a safe information communication society. When this function can be actually realized, a public communication path will be used, and thus information communication or authentication that is safe in terms of information can be realized.

Quantum cryptography is expected as means for physically realizing random number sharing. Global researchers are competing to realize quantum cryptography. On the other hand, since quantum cryptography is physical means, it is difficult to perform secret random number sharing between two parties who are several kilometers or more apart, in other words, to perform the sharing at a realistic random number generation speed, even at the present time due to physical constraints on the realization.

Therefore, as a technology lengthening this distance, a technology (for example, see NPL 1) capable of lengthening the distance despite an unreliable node by locating a node which performs a quantum operation at a relay point was devised. However, the fact that the realization is still difficult technically has not changed.

Therefore, in currently realized large-scale quantum cryptography systems, long-distance random number sharing is realized in accordance with a relay scheme (for example, see NPL 2 and NPL 3). The relay scheme is as follows.

First, a plurality of relay parties are prepared between two parties that share random numbers (random number sharers) as in FIG. 4 and a distance between adjacent parties is set to be within several ten kilometers. In the example of FIG. 4, relay parties B1, B2, and B3 are provided between random number sharers A1 and A2.

The random number sharers and the relay parties share random numbers with adjacent parties by quantum cryptography. In this example, the random number sharer A1 and the relay party B1 share a random number $b_1$ by quantum cryptography, the relay parties B1 and B2 share a random number $b_2$ by quantum cryptography, the relay parties B2 and B3 share a random number $b_3$ by quantum cryptography, and the relay party B3 and the random number sharer A2 share a random number $b_4$ by quantum cryptography. In FIG. 4, dotted arrows indicate sharing by quantum cryptography.

The relay parties calculate XOR of the random numbers shared by both neighbors and publicize a calculation result via a public communication path. XOR is exclusive OR. Here, XOR is indicated by (+). In this example, the relay party B1 calculates $b_{10}=b_1(+)b_2$ using the random numbers $b_1$ and $b_2$ and transmits $b_{10}$ to the random number sharer A2 via the public communication path. The relay party B2 calculates $b_{20}=b_2(+)b_3$ using the random numbers $b_2$ and $b_3$ and transmits $b_{20}$ to the random number sharer A2 via the public communication path. The relay party B3 calculates $b_{30}=b_3 (+) b_4$ using the random numbers $b_3$ and $b_4$ and transmits $b_{30}$ to the random number sharer A2 via the public communication path. In FIG. 4, solid arrows indicate communication paths in which cryptography is not used by quantum cryptography.

The other of the random number sharers A1 and A2 calculates XOR of a supply random number in hand and all the values calculated by the relay parties publicized in public communication paths. In this example, the random number sharer A2 calculates $b_{40}=b_3 (+) b_{10}(+) b_{20} (+) b_{30}$.

At this time, when all the relay parties and the random number sharers behave in accordance with the protocol, a shared random number between desired random number sharers is generated. In this example, $b_1$ and $b_{40}$ are shared random numbers and $b_1=b_{40}$ is satisfied.

Here, when any of the internal states ($b_1$, $b_2$, $b_3$, and $b_4$) of the random number sharers and the relay parties is not wiretapped by a third party, confidentiality of the shared random numbers, that is, a property uncorrelated with a third party other than the random number sharers and the relay parties, is guaranteed even if all the information ($b_{10}$, $b_{20}$, and $b_{30}$) publicized in the public communication paths is recorded by the third party.

When the random number sharing is performed in the relay scheme, all relay parties also have to be reliable. Actually, in the relay scheme, if only one of the relay parties that participate is hacked, the inside is wiretapped, and thus the confidentiality is lost. However, in current information theory, it is generally assumed that a protocol in which all participants need to be trusted is weak. Actually, in discussion of secret distribution for ensuring confidentiality by sharing information among a plurality of participants, a technology for ensuring confidentiality even when some of the participants are hostile has been developed.

There are several countermeasures against awareness of such a problem. First, achieving an improvement in safety by aborting information in nodes on the premise that attacks to nodes are limited (for example, see NPL 4), and a method in which a plurality of paths are set as relay paths and used stochastically or in an overlapping manner, even when some of the paths are taken over, and thus a possibility of safety existing is reduced (for example, see NPL 5 to NPL 7) have been proposed.

CITATION LIST

Non Patent Literature

[NPL 1] "Long-Distance Trust-Free Quantum Key Distribution," IEEE Journal of Selected Topics in Quantum Electronics, Volume 21, Issue 3, 2015
[NPL 2] "SECOQC White Paper on Quantum Key Distribution and Cryptography," arXiv:quant-ph/0701168
[NPL 3] "Field test of quantum key distribution in the Tokyo QKD Network," Optics Express, Vol. 19, Issue 11, pp. 10387 to 10409, 2011
[NPL 4] "How to overcome the 'Trusted Node Model' in Quantum Cryptography," International Conference on Computational Science and Engineering, 2009

[NPL 5] "A Multiple Paths Scheme with Labels for Key Distribution on Quantum Key Distribution Network," IEEE 2nd Advanced Information Technology, Electronic and Automation Control Conference (IAEAC), 2017
[NPL 6] "Security Analysis of Stochastic Routing Scheme in Grid-Shaped Partially-Trusted Relay Quantum Key Distribution Network," Chinese Journal of Electronics 27(2), pp. 234 to 240, 2018
[NPL 7] "Security of Trusted Repeater Quantum Key Distribution Networks," Journal of Computer Security 18(1), pp. 61 to 87, 2010

SUMMARY OF THE INVENTION

Technical Problem

However, in any of the technologies disclosed in NPL 4 to NPL 7, when some of the relay parties are normally under management of a wiretapper, safety in terms of information, which is an advantage of quantum cryptography, may disappear.

An objective of the present invention is to provide an information sharing system, an information sharing method, an information sharing device, a relay device, and a program capable of sharing information safely when there is a path passing through only relay devices which have not been wiretapped although there are relay devices which have been wiretapped.

Means for Solving the Problem

According to an aspect of the present invention, an information sharing system includes a first information sharing device, a plurality of relay devices, and a second information sharing device connected to the first information sharing device along a plurality of paths via the plurality of relay devices. The first information sharing device shares secret information with each relay device adjacent to the first information sharing device along the plurality of paths. The second information sharing device shares secret information with each relay device adjacent to the second information sharing device along the plurality of paths. Each of the plurality of relay devices shares secret information with each relay device adjacent to it along the plurality of paths, generates public information using the shared secret information, and transmits the generated public information to the second information sharing device. The first information sharing device generates shared information using the secret information shared with each relay device adjacent to the first information sharing device along the plurality of paths. The second information sharing device generates shared information using the secret information shared with each relay device adjacent to the second information sharing device along the plurality of paths and the public information received from the relay device.

According to another aspect of the present invention, an information sharing system includes a first information sharing device; a plurality of relay devices; and a second information sharing device connected to the first information sharing device along a plurality of paths via the plurality of relay devices. The first information sharing device shares secret information with each relay device adjacent to the first information sharing device along the plurality of paths. The second information sharing device shares secret information with each relay device adjacent to the second information sharing device along the plurality of paths. Each of the plurality of relay devices shares secret information with each relay device adjacent to it along the plurality of paths, generates public information using the shared secret information, and transmits the generated public information to one of the first and second information sharing devices. The first information sharing device generates shared information using the secret information shared with each relay device adjacent to the first information sharing device along the plurality of paths and the public information received from the relay device. The second information sharing device generates shared information using the secret information shared with each relay device adjacent to the second information sharing device along the plurality of paths and the public information received from the relay device.

Effects of the Invention

Even when there is a relay device which is wiretapped, information sharing can be achieved safely when there is a path passing through only relay devices which have not been wiretapped.

DESCRIPTION OF EMBODIMENTS

Figure 1:
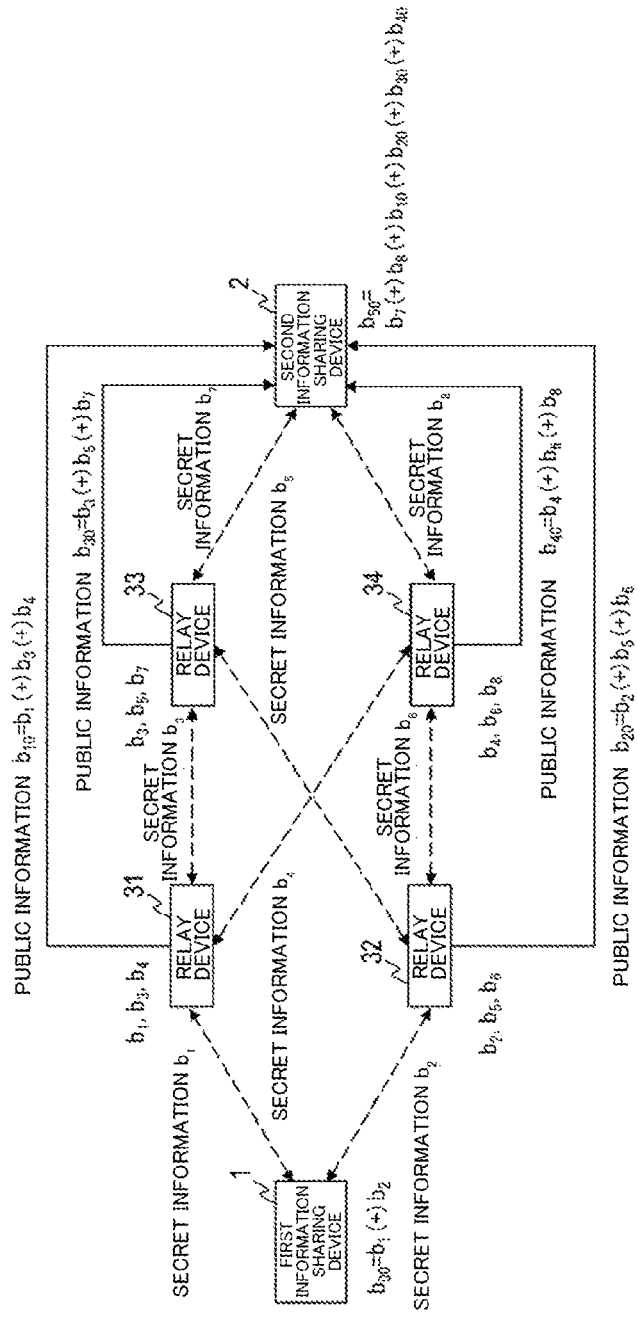
FIG. 1 is a diagram illustrating an example of a functional configuration of an information sharing system.

Hereinafter, embodiments of the present invention will be described in detail. In the drawings, the same reference numerals are given to constituent elements that have the same functions and repeated description thereof will be omitted.

[Information Sharing System and Method]

An information sharing system is a system that shares shared information with a first information sharing device 1 and a second information sharing device 2. Here, the shared information may be, for example, a random number (one-time pad or the like) for cryptographic communication or may be shared information used for other purposes.

As illustrated in FIG. 1, the information sharing system includes, for example, the first information sharing device 1, a plurality of relay devices 31, 32, 33, and 34, and the second information sharing device 2. To facilitate description, a case in which the relay devices are the four relay devices 31, 32, 33 and 34 will be described as an example. However, the relay devices may be two or more relay devices.

The second information sharing device 2 is connected to the first information sharing device 1 via the plurality of relay devices along a plurality of paths.

In the example of FIG. 1, the first information sharing device 1 and the second information sharing device 2 are connected along four paths, (1) the first information sharing device 1→the relay device 31→the relay device 33→the second information sharing device 2, (2) the first information sharing device 1→the relay device 31→the relay device 34→the second information sharing device 2, (3) the first information sharing device 1→the relay device 32→the relay device 33→the second information sharing device 2, and (4) the first information sharing device 1→the relay device 32→the relay device 34→the second information sharing device 2.

The first information sharing device 1, the plurality of relay devices, and the second information sharing device 2 share information in accordance with, for example, a so-called relay scheme to be described below.

Figure 2:
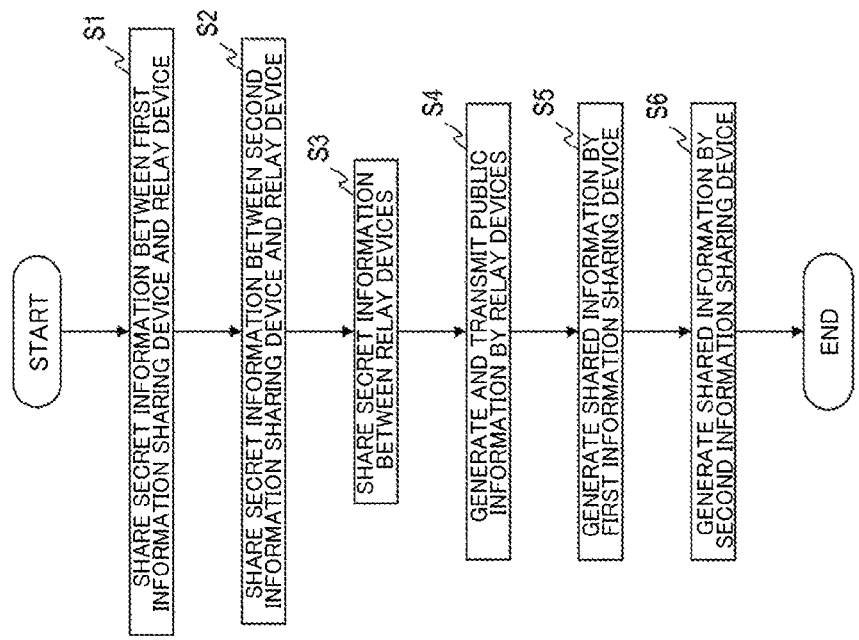
FIG. 2 is a diagram illustrating an example of a processing procedure of an information sharing method.

An information sharing method is realized by, for example, processing from step S1 to step S6 illustrated in FIG. 2 to be described below.

Hereinafter, each device included in the information sharing system will be described.

<First Information Sharing Device 1>

The first information sharing device 1 shares secret information with each relay device adjacent to the first information sharing device 1 along a plurality of paths (step S1). When the secret information is shared, the secret information may be shared between both sharing parties by quantum cryptographic communication or the secret information may be shared by a classical method. The classical method is, for example, a method performed by classical cryptographic communication, a method of sharing a recording medium on which secret information is recorded, or the like.

In the example of FIG. 1, the first information sharing device 1 is adjacent to the relay devices 31 and 32. The first information sharing device 1 shares secret information $b_1$ with the relay device 31. The first information sharing device 1 shares secret information $b_2$ with the relay device 32. In FIG. 1, dotted arrows indicate sharing of the secret information.

In the embodiment, the secret information $b_1$ and $b_2$ and the secret information $b_3, \ldots, b_8$ appearing in the following description will be described as bits (information of 0 or 1). For example, the secret information is a random-number bit.

The first information sharing device 1 generates shared information using the secret information shared with each relay device adjacent to the first information sharing device 1 along the plurality of paths (step S5). A specific example of the processing will be described below. The shared information is the same value as the shared information generated by the second information sharing device 2.

<Second Information Sharing Device 2>

The second information sharing device 2 shares secret information with each relay device adjacent to the second information sharing device 2 along a plurality of paths (step S2).

In the example of FIG. 1, the second information sharing device 2 is adjacent to the relay devices 33 and 34. The second information sharing device 2 shares secret information $b_7$ with the relay device 33. The second information sharing device 2 shares secret information $b_8$ with the relay device 34.

The second information sharing device 2 generates shared information using the secret information shared with each relay device adjacent to the second information sharing device 2 along the plurality of paths and public information received from all the relay devices after the processing of step S4 to be described below (step S6). A specific example of the processing will be described below.

<Relay Devices>

The relay devices are disposed on a plurality of paths connecting the first information sharing device to the second information sharing device 2. In the example of FIG. 1, the relay devices are the four relay devices 31, 32, 33, and 34.

The relay devices are disposed so that information can be shared with the adjacent devices (the first information sharing device 1, the second information sharing device 2, and the relay devices) along the plurality of paths. For example, distances between the devices adjacent to the relay devices along the plurality of path are considered to be within several ten kilometers.

Each of the plurality of relay devices shares secret information with each of the relay devices adjacent to it along a plurality of paths (step S3).

Then, each of the plurality of relay devices generates public information using the shared secret information and transmits the generated public information to the second information sharing device 2 (step S4). The public information is transmitted to the second information sharing device 2 via a public communication path. The public information may be encrypted in accordance with classical cryptography to be transmitted to the second information sharing device 2.

In the example of FIG. 1, the relay device 31 is adjacent to the relay devices 33 and 34. The relay device 31 shares the secret information $b_3$ with the relay device 33. The relay device 31 shares the secret information $b_4$ with the relay device 34. The relay device 31 shares the secret information $b_1$ with the first information sharing device 1. The relay device 31 generates public information $b_{10}=b_1(+)b_3(+)b_4$ using the shared secret information $b_1$, $b_3$, and $b_4$ and transmits the generated public information $b_{10}$ to the second information sharing device 2. Here, (+) indicates an exclusive OR or XOR. In FIG. 1, solid arrows indicate unencrypted communication paths.

In the example of FIG. 1, the relay device 32 is adjacent to the relay devices 33 and 34. The relay device 32 shares the secret information $b_5$ with the relay device 33. The relay device 32 shares the secret information $b_6$ with the relay device 34. The relay device 32 shares the secret information $b_2$ with the first information sharing device 1. The relay device 32 generates public information $b_{20}=b_2(+)b_5(+)b_6$ using the shared secret information $b_2$, $b_5$, and $b_6$ and transmits the generated public information $b_{20}$ to the second information sharing device 2.

In the example of FIG. 1, the relay device 33 is adjacent to the relay devices 31 and 32. The relay device 33 shares the secret information $b_3$ with the relay device 31. The relay device 33 shares the secret information $b_5$ with the relay device 32. The relay device 33 shares the secret information $b_7$ with the second information sharing device 2. The relay device 33 generates public information $b_{30}=b_3(+)b_5(+)b_7$ using the shared secret information $b_3$, $b_5$, and $b_7$ and transmits the generated public information $b_{30}$ to the second information sharing device 2.

In the example of FIG. 1, the relay device 34 is adjacent to the relay devices 31 and 32. The relay device 33 shares the secret information $b_4$ with the relay device 31. The relay device 33 shares the secret information $b_6$ with the relay device 32. The relay device 33 shares the secret information $b_8$ with the second information sharing device 2. The relay device 33 generates public information $b_{40}=b_4(+)b_6(+)b_8$ using the shared secret information $b_4$, $b_6$, and $b_8$ and transmits the generated public information $b_{40}$ to the second information sharing device 2.

The example of the processing of the relay devices has been described above.

In the example of FIG. 1, after the processing of step S1, the first information sharing device 1 generates shared information $b_{00}=b_1(+)b_2$ using the secret information $b_1$ shared with the relay device 31 and the secret information $b_2$ shared with the relay device 32 (step S5).

In the example of FIG. 1, after the processing of step S4, the second information sharing device 2 generates public information $b_{50}=b_7(+)b_8(+)b_{10}(+)b_{20}(+)b_{30}(+)b_{40}$ using the secret information $b_7$ shared with the relay device 33, the secret information $b_8$ shared with the relay device 34, and the public information $b_{10}$, $b_{20}$, $b_{30}$, and $b_{40}$ generated by the relay devices 31, 32, 33, and 34 (step S6).

The shared information $b_{00}$ generated by the first information sharing device 1 coincides with the shared information $b_{50}$ generated by the second information sharing device 2. The operation of exclusive OR is an operation which results in 0 in the case of the same value and otherwise results in 1. That is, when the same secret information appears an even number of times in an operation of obtaining the shared information, the secret information is offset to become 0. In the foregoing example, this is because, in the shared information $b_{50}$ generated by the second information sharing device, information shared between the relay devices and the information shared between the relay device and the second information sharing device are offset and $b_1(+)b_2$ remains.

A graph will be considered that has the first information sharing device 1, the second information sharing device 2, and the relay devices as vertexes and sides between two parties sharing the shared information in the embodiment. At this time, when there is a path passing through only relay devices which have not been wiretapped in the plurality of paths connecting the first information sharing device 1 to the second information sharing device 2 in the graph, confidentiality of the shared information is guaranteed even if all the information publicized along the public communication path is recorded by a third party. That is, a property is guaranteed in which information acquired by a third party other than the first information sharing device 1, the second information sharing device 2, and the relay devices is uncorrelated with the shared information shared between the first information sharing device 1 and the second information sharing device 2. When there is a path passing through only the relay devices which have not been wiretapped in the graph, the shared information related to the path remains without being offset, and therefore the third party cannot obtain the same information as the information obtained by the information sharers.

In the case of the example of FIG. 1, even when the relay devices 31 and 34 are wiretapped, confidentiality of the shared information is guaranteed because of the presence of a path passing through only the relay devices which have not been wiretapped, such as (3) the first information sharing device 1→the relay device 32→the relay device 33→the second information sharing device 2.

In this way, according to the foregoing embodiment, even when there are relay devices which have been wiretapped, the sharing of the information can be safely performed when there is a path passing through only the relay devices which have not been wiretapped.

[Modified Examples]

The embodiment of the present invention has been described above, but a specific configuration is not limited to the embodiment. It is needless to say that appropriate modifications of design made within the scope of the present invention without departing from the gist of the present invention are included in the present invention.

In the example of FIG. 1, the public information is all received by the second information sharing device 2, as illustrated, but the present invention is not limited thereto. For example, some of the public information (for example, $b_{30}$) may be received by the first information sharing device 1 and the remaining public information (in this case, $b_{40}$) may be received by the second information sharing device 2.

In this case, the processing of both steps S5 and S6 is processing for generating each piece of shared information using the public information received from each relay device and the secret information shared with each relay device adjacent to each information sharing device.

In short, the public information generated by each relay device is transmitted to one of the first information sharing device 1 and the second information sharing device 2. That is, the same public information is not received in duplicate by the first information sharing device 1 and the second information sharing device 2. Some of the public information is always received by any of the first information sharing device 1 and the second information sharing device 2.

Each information sharing device generates the shared information using the public information received by each information sharing device and the secret information shared with each of the adjacent relay devices. The public information generated by each relay device is exclusive OR of information owned by the relay device itself (shared with another relay device or the information sharing device). The shared information generated by each information sharing device is exclusive OR of information received or owned by the information sharing device itself (shared with another relay device). Thus, the shared information generated by the first information sharing device 1 and the second information sharing device 2 coincide with each other.

Specific examples of the public information and the secret information illustrated in FIG. 1 are merely exemplary. The public information and the secret information may be different values or expressions.

For example, in the above-described embodiment, the case in which the secret information is a bit has been described as an example, but the present invention is not limited to a bit and information which can take n values (where n is a natural number equal to or greater than 2) may be used. For example, n may be a positive predetermined integer equal to or greater than 2 and the secret information may be an integer in the range from 0 to n−1. In this case, the first information sharing device 1, the second information sharing device 2, and the relay devices are assumed to share information that has an offsetting relation as the secret information. Instead of exclusive OR of the secret information or the public information, the secret information or the public information is calculated through an operation indicating the offsetting relation.

For example, when the operation indicating the offsetting relation is adding, the first information sharing device 1, the second information sharing device 2, and the relay devices are assumed to have share reverse numbers (information with reverse signs). For example, in the example of FIG. 1, in a state in which the first information sharing device 1 share the secret information $b_1$, the relay device 31 shares secret information $-b_1$, the relay device 31 shares the secret information $b_3$, and the relay device 33 shares secret information $-b_3$, the information owned by the devices that have the sharing relation has a relation of reverse signs. Then, the first information sharing device 1 and the second information sharing device 2 perform adding instead of the exclusive OR of the secret information or the public information, and thus the shared information can be shared.

When the secret information is an integer from 0 to n−1, in the example of FIG. 1, the first information sharing device 1 calculates $b_{00}=b_1+b_2$ instead of $b_{00}=b_1\,(+)\,b_2$, and the calculation result is set as the shared information. The second information sharing device 2 calculates $b_{50}=b_7+b_8+b_{10}+b_{20}+b_{30}+b_{40}$ instead of $b_{50}=b_7\,(+)\,b_8\,(+)\,b_{10}(+)\,b_{20}\,(+)\,b_{30}\,(+)\,b_{40}$, and the calculation result is set as the shared information. The relay device 31 calculates $b_{10}=b_1-b_3-b_4$ instead of $b_{10}=b_1(+)b_3(+)b_4$, and the calculation result is set as the public information. The relay device 32 calculates $b_{20}=b_2-b_5-b_6$ instead of $b_{20}=b_2(+)b_5(+)b_6$, and the calculation result is set as the public information. The relay device 33 calculates $b_{30}=b_3+b_5-b_7$ instead of $b_{30}=b_3(+)b_5(+)b_7$, and the calculation result is set as the public information. The relay device 34 calculates $b_{40}=b_4+b_6-b_8$ instead of $b_{40}=b_4(+)b_6(+)b_8$, and the calculation result is set as the public information. Thus, a sum of the public information calculated by the relay devices is $b_{10}+b_{20}+b_{30}+b_{40}=b_1+b_2-b_7-b_8$. As a result, the shared information $b_{50}=b_7+b_8+b_{10}+b_{20}+b_{30}+b_{40}=b_1+b_2$ calculated by the second information sharing device 2 coincides with the shared information calculated by the first information sharing information 1.

Not only is the various kinds of processing described in the embodiment performed chronologically in the described order, but may also be performed in parallel or individually in accordance with processing capability of the device performing the processing or as necessary. For example, since the processing of the above-described step S5 (the generation of the shared information in the first information sharing device 1) is independent from the processing of step S6 (the generation of the shared information in the second information sharing device 2), the processing is performed in serial in the circumstance illustrated in FIG. 2. However, it is needless to say that an operation may be simultaneously performed in each information sharing device or either step S6 or step S5 may be performed earlier.

Exchange of the information between the devices included in the information sharing system may be performed directly or may be performed via other devices (not illustrated).

[Program and Recording Medium]

Figure 3:
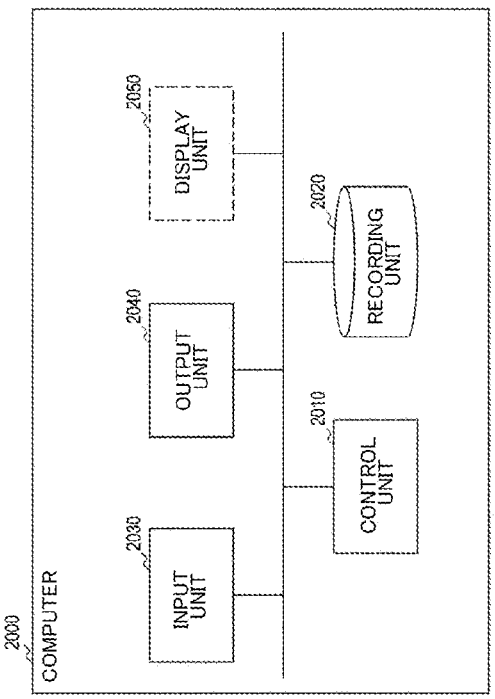
FIG. 3 is a diagram illustrating an exemplary functional configuration of a computer.
Figure 4:
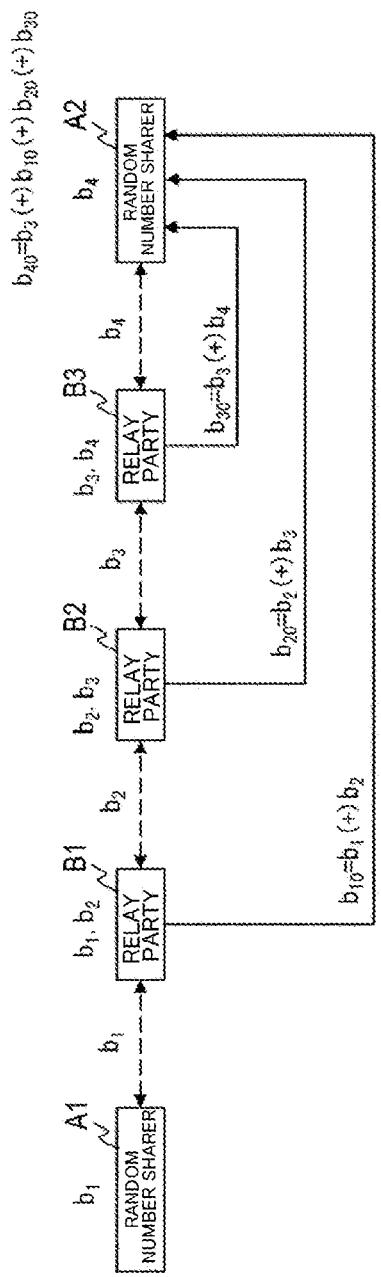
FIG. 4 is a diagram illustrating a background technology.

When the various processing functions in the above-described devices are realized by a computer, processing content of the functions of the devices is described by a program. When a computer executes the program, the various processing functions in the foregoing devices are realized on the computer. For example, the above-described various kinds of processing can be performed by allowing a recording unit 2020 of the computer illustrated in FIG. 3 to read the program to be executed and allowing a control unit 2010, an input unit 2030, and an output unit 2040 to perform operations.

The program describing the processing content can be recorded on a computer-readable recording medium. As the computer-readable recording medium, for example, any of a magnetic recording device, an optical disc, a magneto-optical recording medium, a semiconductor memory, and the like can be used.

The program is distributed, for example, by selling, transferring, or lending a portable recording medium such as a DVD or a CD-ROM on which the program is recorded. Further, the program may be distributed by storing the program in a storage device of a server computer and transmitting the program from the server computer to another computer via a network.

For example, the computer executing the program temporarily stores the program recorded on a portable recording medium or the program transmitted from the server computer in an own storage device. When processing is performed, the computer reads the program stored in the own storage device and performs the processing in accordance with the read program. As another embodiment in which the program is executed, a computer may read the program directly from a portable recording medium and perform the processing in accordance with the program, or may perform the processing according to the received program in order whenever the program is transmitted from the server computer to the computer. The above-described processing may be performed by a so-called application service provider (ASP) type service realizing the processing function only in accordance with an execution instruction and result acquisition without transmitting the program from the server computer to the computer. The program according to the embodiment is assumed to include data which is information provided for processing by an electronic computer and conforms to the program (data or the like that has a property defining processing of a computer rather than a direct instruction to the computer).

According the embodiment, the devices are configured by executing a predetermined program on a computer, but at least some of the processing content may be realized by hardware.

The invention claimed is:

1. An information sharing system comprising:
a first information sharing device;
a plurality of relay devices; and
a second information sharing device connected to the first information sharing device along a plurality of paths via the plurality of relay devices,
wherein the first information sharing device shares secret information with a first set of relay devices adjacent to the first information sharing device along the plurality of paths,
wherein the second information sharing device shares the secret information with a second set of relay devices adjacent to the second information sharing device along the plurality of paths,
wherein one or more relay devices of the plurality of relay devices share the secret information with a third set of relay devices adjacent to the one or more relay devices along the plurality of paths, the one or more relay devices generate public information using the shared secret information, and the one or more relay devices transmit the generated public information to the second information sharing device,
wherein the first information sharing device generates the shared information using the secret information shared with the first set of relay devices adjacent to the first information sharing device along the plurality of paths, and
wherein the second information sharing device generates the shared information using the secret information shared with the second set of relay device adjacent to the second information sharing device along the plurality of paths and the public information received from the relay device.

2. The information sharing system according to claim 1, wherein the secret information is random number information used to perform cryptographic communication between the first and second information sharing devices.

3. The information sharing system according to claim 1, wherein the secret information is shared in quantum cryptographic communication.

4. The information sharing system according to claim 1, wherein the shared secret information is information that has an offsetting relation under a predetermined operation and is generated by applying the predetermined operation to the shared or acquired information with regard to the public information and the shared information.

5. The information sharing system according to claim 1, wherein the secret information includes a random-number bit.

6. An information sharing system comprising:
a first information sharing device;
a plurality of relay devices; and
a second information sharing device connected to the first information sharing device along a plurality of paths via the plurality of relay devices,
wherein the first information sharing device shares secret information with a first set of relay devices adjacent to the first information sharing device along the plurality of paths,
wherein the second information sharing device shares secret information with a second set of relay devices adjacent to the second information sharing device along the plurality of paths,
wherein one or more relay devices of the plurality of relay devices share the secret information with a third set of relay devices adjacent to the one or more relay devices along the plurality of paths, the one or more relay devices generate public information using the shared secret information, and transmits the generated public information to one of the first and second information sharing devices,
wherein the first information sharing device generates shared information using the secret information shared with the first set of relay device adjacent to the first information sharing device along the plurality of paths and the public information received from the relay device, and
wherein the second information sharing device generates shared information using the secret information shared with the second set of relay device adjacent to the second information sharing device along the plurality of paths and the public information received from the relay device.

7. The information sharing system according to claim 6, wherein the secret information is random number information used to perform cryptographic communication between the first and second information sharing devices.

8. The information sharing system according to claim 6, wherein the secret information is shared in quantum cryptographic communication.

9. The information sharing system according to claim 6, wherein the shared secret information is information that has an offsetting relation under a predetermined operation and is generated by applying the predetermined operation to the shared or acquired information with regard to the public information and the shared information.

10. The information sharing system according to claim 6, wherein the secret information includes a random-number bit.

11. An information sharing method comprising:
sharing, by a first information sharing device, secret information with each relay device adjacent to the first information sharing device along a plurality of paths;
sharing, by a second information sharing device, the secret information with each relay device adjacent to the second information sharing device along the plurality of paths;
sharing, by each of a plurality of relay devices, the secret information with each relay device adjacent to it along the plurality of paths;
generating, by each of the plurality of relay devices, public information using the shared secret information and transmitting the generated public information to the second information sharing device;
generating, by the first information sharing device, shared information using the secret information shared with each relay device adjacent to the first information sharing device along the plurality of paths;
generating, by the second information sharing device, the shared information using the secret information shared with each relay device adjacent to the second information sharing device along the plurality of paths and the public information received from the relay device; and
connecting the second information sharing device to the first information sharing device along the plurality of paths via the plurality of relay devices.

12. The information sharing method according to claim 11 wherein the secret information is random number information used to perform cryptographic communication between the first and second information sharing devices.

13. The information sharing method according to claim 11, herein the secret information is shared in quantum cryptographic communication.

14. The information sharing method according to claim 11, wherein the shared secret information is information that has an offsetting relation under a predetermined operation and is generated by applying the predetermined operation to the shared or acquired information with regard to the public information and the shared information.

15. The information sharing method according to claim 11, wherein the secret information includes a random-number bit.

* * * * *